Oct. 6, 1953      J. A. TUCK      2,654,864
MOISTURE METER
Filed July 23, 1949
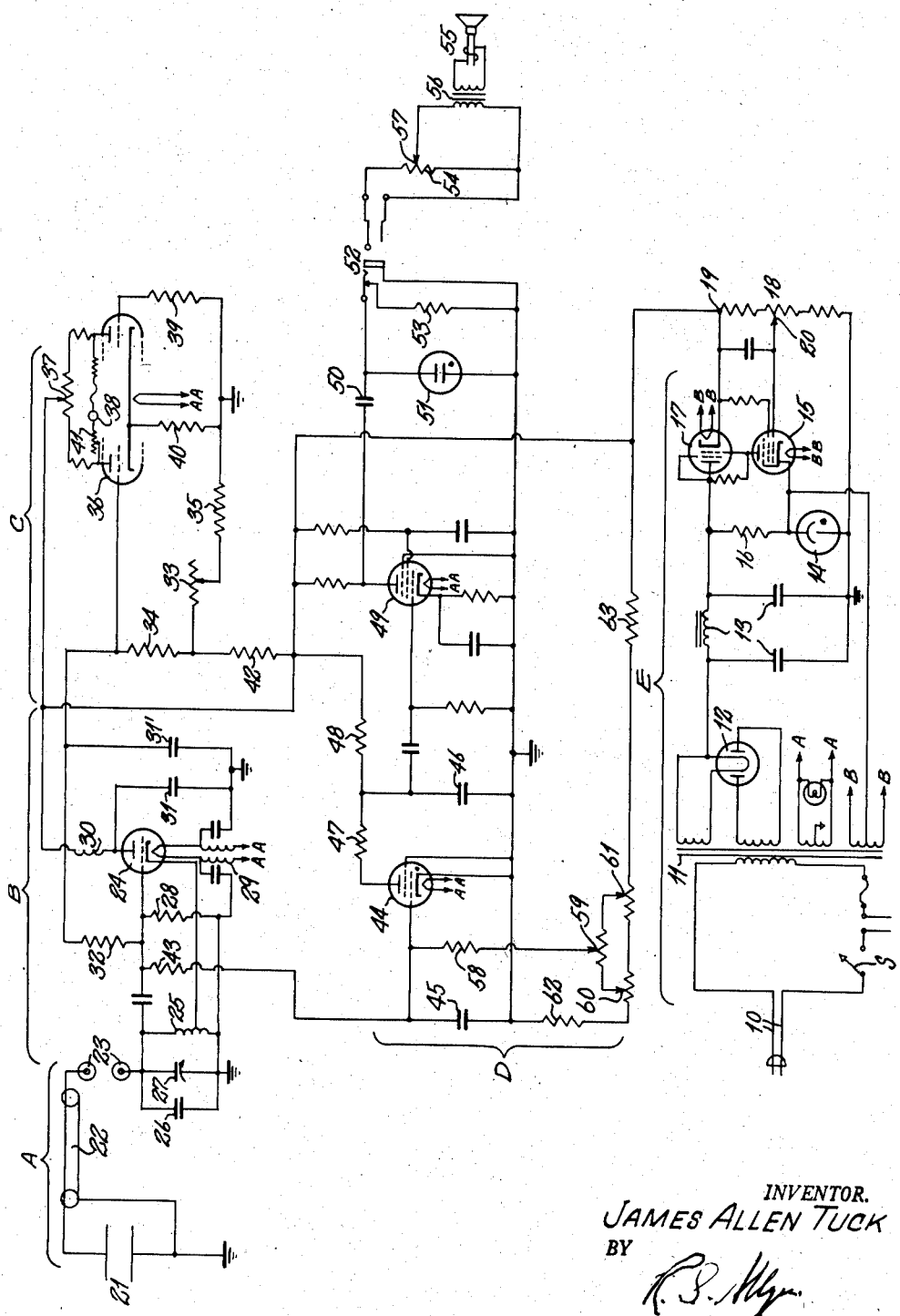
INVENTOR.
JAMES ALLEN TUCK
BY
*ATTORNEY*

Patented Oct. 6, 1953

2,654,864

UNITED STATES PATENT OFFICE 2,654,864

MOISTURE METER

James Allen Tuck, New York, N. Y., assignor to Carolyn Lahr, Philadelphia, Pa.

Application July 23, 1949, Serial No. 106,412

6 Claims. (Cl. 324—61)

This invention relates to a system and apparatus for the determination of moisture content of various types of materials.

The main object of this invention is to provide a method and apparatus for the measurement of the relative moisture content of various materials such as paper, pulp, textiles in bulk or fabric form, flour, grain, granulated sugar or salt, powdered pharmaceuticals, dried food products such as dried milk, eggs, fruit, tobacco and other materials which are poor electrical conductors.

A special object is to provide a system and apparatus capable of determining the moisture content of such materials at high speed.

Determination of the moisture content of various materials has hitherto been performed in a variety of fashions. These fall into two general categories. In the first, the moisture is substantially completely removed from a specimen. In this class, again, the determination may be by gravimetric measurements upon the material itself, or the removed moisture may be absorbed in a secondary body, the change of some physical property of which, such as weight or dimension, is then measured. Such methods have been adapted also to electrical determinations of such absorbed moisture, as by resistance or dielectric property changes. Such methods are inherently ill adapted to the determination of moisture in continuously moving material.

The other general class of hygrometric devices for determinations are characterized by the application of some measuring instrument to the specimen, without removal of the moisture therefrom. In this class, both light and electricity have been among the natural forces utilized to investigate the material, without altering the constitution thereof.

In the general category of electrical instruments, into which the present invention falls, there have been two principal methods proposed, i. e. by the determination of electrical conductance, and that of dielectric properties, both of which may be said to be functions of the moisture content of the material. The many defects of the various types of conductance testing are well known in the art, including the virtual impossibility of securing uniform, adequate and stable contact with the material, the fact that the distribution of moisture content throughout the material is not uniform, and electrode polarization troubles.

The present device uses changes in the specific inductive capacity and dielectric losses as parameters for moisture measurement. This demands no actual physical contact with the material, and rapidly moving material may be continuously tested, and instantaneous indications of the moisture content thereof be obtained with the greatest facility, unlike the manual balancing required by prior art instruments of this general type.

In general, instruments of the capacitive type locate the specimen to be tested between fixed electrodes forming the two plates or armatures of a condenser. Such a condenser is made to determine the frequency of an oscillatory circuit or an arm of a bridge, which is de-tuned by changes in moisture in the material.

In such instruments, the degree of retuning needed to restore such circuit to the initial frequency or the bridge to balance thereof is a measure of the moisture content.

The radical differences of the instant invention are in large measure due to the fact that it utilizes dielectric loss, as well as specific inductive capacity, as a moisture measuring parameter. It measures, not frequency, which is a very difficult factor to measure accurately at high speed, but measures merely the potential changes occurring across the grid resistor of an oscillating tube, to the grid of which the condenser formed with the test specimen is coupled. The higher order of magnitude of changes in dielectric loss and specific inductive capacity, compared with changes in specific inductive capacity alone, yield quantities requiring less amplification in order easily to be measured, thereby reducing cost and energy consumption, and yielding more accurate results.

In this invention, the mentioned change of potential is first utilized to upset an electronic bridge, a meter indicating the unbalance as potential, and being graduated to read directly in moisture content. Secondly, the same potential is used to trigger an electronic relay tube and give one or more alarms when a predetermined maximum moisture content is reached or exceeded. The relay is instantaneously self-restoring and the level of permissible moisture is adjustable by the operator and at all times visible to him.

Referring now to the drawing, which is a schematic representation of this invention, the portion A of the circuit is the fixture through or over which the material to be measured is placed or passes. The portion B is an oscillatory tube arrangement. The portion C is an electronic bridge, arranged to afford indications of changes of potential of the grid of the tube of portion A.

Portion D is an alarm arrangement, actuated by the change of potential just mentioned, including the gas-filled trigger tube, amplifier and audible or visible alarm. Portion E is a regulated supply of continuous current, derived from alternating current mains.

Portion E may be constituted by any device which will furnish a continuous current output of sufficiently constant potential. Since the general theory and operation of such devices as the electronic rectifying and stabilizing A. C./D. C. converter here shown are well known, detailed description thereof is deemed unnecessary.

A. C. mains 10 feed transformer 11, via switch S. Conventional low-voltage secondaries feed the heaters of all tubes of the apparatus.

Full wave rectifier 12 delivers an output via filter 13 to gas filled stabilizer tube 14, which establishes on the cathode of tube 15 a substantially constant potential with the aid of resistance 16. Tube 17 has the internal resistance thereof changed by D. C. amplifier tube 15, so as to maintain constant output voltage between the cathode of tube 17 and ground. Potentiometer 18, with adjustable tap 20, keeps point 19 at a constant desired potential with respect to ground, all operating voltages being derived from this point, of which a suitable potential is around 250 volts.

Portion A is constituted by any suitable condenser type fixture 21, as known in the art of measuring dielectric properties of removable samples. It may be arranged for the insertion of a single sample, or a continuous flow of material to be tested may pass continuously therethrough. One side is earthed, and H. F. cable 22, preferably of extremely low capacity, connects as a transmission line to plug and jack 23.

Portion B includes triode 24, preferably of a type such as that known as 6J5, connected in an oscillatory circuit comprising inductor 25, suitable in value to form with main capacitor 26 and trimmer 27 a circuit having a fundamental oscillatory period around 25 megacycles. Fixture 21 is shunted across this circuit, thereby affecting potentials developed across grid resistor 28. The heater of the tube is isolated by a conventional filter 29, and the anode is isolated by choke coil 30 and by-passed by capacitor 31 to earth. The various isolation and by-pass capacitors are of conventional values and not critical as to size.

Portion C comprises an electronic balanced bridge voltmeter circuit. It measures the decrease in voltage across resistor 28 caused by increasing capacity and dielectric losses which are proportional to moisture in the sample being tested. This bridge may be of any suitable type for the range of voltages to be encountered. It is coupled to the oscillator tube via resistor 32, which may be of about 1 megohm and the filter condenser 31'. With no specimen being tested, variable resistor 33, connected via resistors 34 and 35, serves to balance the bridge. Resistor 33 may be 3 kilohms, 34 1 megohm, and 35 2,200 ohms. A polyfunctional tube 36, such as a 6SN7-GT, fed as to anodes via 43 kilohm resistors and balancing potentiometer 37 of 20 kilohms are connected in conventional fashion. Resistor 39 of 1 megohm balances resistor 34. Resistor 40 of about 10 kilohms furnishes suitable bias. Meter 38 of suitable range is coupled via usual resistors of about 100 kilohms and protective fuse. This meter is calibrated to read directly in values of the moisture in the material, using for this purpose variable resistor 41. Resistor 42, of 65 kilohms, reduces voltage across 33 and 35 to a suitable level.

Portion D is coupled to the grid of the oscillator tube of portion B via resistor 43 of 2.2 megohms. Capacitor 45 by-passes the H. F. current from the grid of tube 44 to ground. Tube 44 may be of the type known as 2050, as gas-filled type sometimes termed a "thyratron," and oscillates at a frequency of about 3500 cycles, determined by condenser 46 of about .006 mfd. and by resistor 48 which is about 510 kilohms and which also supplies the anode potential.

The alarm elements of portion D include an amplifier tube 49, which may be of type 6AG7, using conventional resistance capacitance coupling, employing on the input side capacitor 46, and on the output side capacitor 50, each of which is about 0.1 mfd. The output from the tube 49 is applied to a cathode glow lamp 51 which may be of any suitable type. The usual bias, potential-dropping resistors, by-pass capacitors, and coupling capacitors and resistors are used in circuit with this tube 49, suitable values for this type of tube being well-known in the art.

In order to afford an audible limit alarm signal, additionally to the visual signal given by the gas lamp, a plug and jack 52 is provided. When the speaker plug is pulled out of the jack, a resistor 53 of 8.2 kilohms is automatically connected to provide a suitable load for tube 49. Loudspeaker 55 is fed via impedance matching transformer 56, and controlled as to acoustical output by variable tap 57, on resistor 54.

In order to determine the potential at which the thyratron will commence to oscillate, there is applied thereto, not only the potential reaching the grid of the tube via resistor 43 from the high frequency oscillator, but also a bucking potential, via resistor 58, of about 3 megohms. This bucking potential is derived from a network comprising the three variable resistors 59 of 100 kilohms, 60 of 1 kilohm, 61 of 2 kilohms, and the two fixed resistors 62 of 510 ohms and 63 of 50 kilohms. The adjustable element of resistor 59 is located so as readily to be manually adjustable, for instance upon a panel (not shown) having limit markings. The adjustment of resistor 61 is likewise conveniently placed upon the same panel, which preferably also carries the zero adjusting control for the meter, the two jacks, the switch for the power supply, the gas filled glow lamp, protective fuses and the like. Resistor 60 is to adjust the actual voltage derivable from resistor 59, at the end corresponding to high moisture content, and resistor 61 provides for a similar adjustment of the low moisture end of the scale of resistor 59, which is located upon the panel and calibrated in moisture content.

The broad principles underlying the operation of this device are that changes in dielectric capacity and dielectric losses in the material under test, due to varying moisture content, will so alter the potential of the grid of the H. F. tube 24 as to change the magnitude of the normal potential thereacross. The measurement of the amount of change of the potential by the balanced bridge voltmeter is conducted as well known in the art. The calibration of the meter in terms of moisture content may readily be made by using specimens of a moisture content which has previously been ascertained by other means, for example, by expelling the moisture from the specimen, by increasing the vapor tension by heat, or by employing hydrophilic liquids and making gravimetric determinations before and after such process.

The triggering of a thyratron tube at a critical grid voltage is well known, but the manner in which the applied triggering voltage is made to represent certain resultants of the voltage from the H. F. oscillator and voltage from a bucking out circuit, and the manner in which resistor 59 is made to read directly in maximum permissible moisture content, before triggering occurs, and the alarm sounded, is unique and novel.

The initial adjustments and operating steps for an instrument constructed as above described are as follows. After applying power and waiting for thermal stabilization of the various components, with the fixture empty, resistor 33 is adjusted to give zero grid voltage on tube 36. Resistor 37 is adjusted until the meter 38 indicates zero current. Resistor 59 is set to A on panel of resistance 59 a point determined experimentally so that readings of moisture contents will fall at the pre-selected locations on the dial and 61 is adjusted until the neon tube begins to flash intermittently. A sample of known moisture content is then inserted in the fixture. Resistor 41 is adjusted to cause the meter to read correctly toward the upper end of the scale thereof. Zero re-set will again be required. This is done by adjusting 37 with the samples removed. The sample is then re-inserted. Resistor 59 is adjusted until the side reading agrees with the meter reading. Resistor 60 is then altered until the neon tube or lamp begins to flash intermittently. A zero adjustment with material removed is again made by resistor 61. The meter is now calibrated for use. In the field the only adjustments required are the zero adjustments as above described. When the set is to be used the limit dial indicator is set to the moisture level predetermined as the maximum permissible.

After these adjustments the system is ready for use. Material put in the fixture will give a direct reading of the relative moisture content on the meter. When such content reaches the point to which the limit scale pointer of resistor 59 has been set, triggering will occur and the alarm be sounded. By this method it is possible to determine the moisture content of any such type of material either in bulk form or in a continuous moving mass at high speed.

A continuous record showing the variations of moisture content of a travelling web of material may be provided by conventional recording apparatus.

While I have shown and described certain values and connections of the various components, other values and modes of connecting the same will be apparent to those skilled in the art, and may be made without departure from the spirit of this invention, which is therefore limited only by the scope of the hereunto appended claims.

I claim:

1. A moisture meter of the type wherein changes of the dielectric properties of a material to be tested are taken as a measure of moisture content, including a first electronic tube circuit and means for maintaining said tube in oscillation, a resistor in the input circuit of said oscillating tube, a capacitor connected to said resistor and having the material to be tested forming at least a portion of the dielectric thereof, whereby changes in the dielectric properties of said material alter the continuous current potential appearing across said resistor, means for indicating said potential and filter means interposed between said indicating means and said resistor, whereby substantially only continuous current potentials are indicated.

2. A moisture meter according to claim 1, wherein said potential indicating means include an electronic bridge connected to said input resistor via said filter means and visually indicating means connected to said bridge so as to be actuated by changes of potential therein induced by changes of potential occurring across said resistor.

3. Apparatus for determining the relative moisture content of material, including a fixture comprising a capacitor, the dielectric of which latter is formed to a substantial degree by said material, a relatively high frequency generator connected to said capacitor, said generator including at least one resistive element across which is developed a continuous current potential which is a function of the moisture content of said material, a voltmeter connected across said resistive element, whereby to measure said potential, and a filter interposed between said voltmeter and said resistive element, whereby substantially solely continuous current potentials reach said voltmeter.

4. Apparatus according to claim 3, wherein said voltmeter has the indicating element thereof calibrated so as to read directly in terms of moisture content.

5. Apparatus according to claim 4, wherein said voltmeter is of the electronic bridge type and includes adjustable means for balancing the bridge so that the indicator thereof will indicate zero moisture when the potential developed across said resistive element is due solely to the action of said generator at a time when material of substantially zero moisture content is positioned in said fixture.

6. Apparatus according to claim 3, wherein said generator is of the oscillating electronic tube type, and said resistive element is connected so as to have developed thereacross a continuous current potential which is a function of the oscillatory energy developed by said generator.

JAMES ALLEN TUCK.

References Cited in the file of this patent

UNITED STATES PATENTS

| Number | Name | Date |
|---|---|---|
| 1,701,975 | Gunn | Feb. 12, 1929 |
| 1,724,508 | Nauth | Aug. 13, 1929 |
| 1,815,717 | Kranz | July 21, 1931 |
| 1,822,604 | Simons et al. | Sept. 8, 1931 |
| 1,943,619 | Mudge et al. | Jan. 16, 1934 |
| 2,041,114 | Carini | May 19, 1936 |
| 2,177,528 | Kidd | Oct. 24, 1939 |
| 2,215,805 | Wills | Sept. 24, 1940 |
| 2,231,035 | Stevens et al. | Feb. 11, 1941 |
| 2,266,114 | Bartlett | Dec. 16, 1941 |
| 2,373,079 | Morelock | Apr. 3, 1945 |
| 2,518,045 | May | Aug. 8, 1950 |
| 2,529,846 | McBrayer et al. | Nov. 14, 1950 |
| 2,599,583 | Robinson et al. | June 10, 1952 |